United States Patent Office 3,290,352
Patented Dec. 6, 1966

3,290,352
ORTHOHYDROXYBENZYL BORATES
Pierre Andre Robert Marchand, Caluire, and Jean Baptiste Grenet, Bron, France, assignors to Rhone-Poulenc S.A., Paris, France, a corporation of France
No Drawing. Original application Mar. 26, 1963, Ser. No. 267,929. Divided and this application Jan. 21, 1964, Ser. No. 344,519
Claims priority, application France, Mar. 28, 1962, 892,539
6 Claims. (Cl. 260—462)

The present application is a divisional application of our co-pending application Serial No. 267,929, filed March 26, 1963.

This invention relates to the production of ortho-hydroxybenzyl alcohols, especially ortho-hydroxybenzyl alcohol itself, commonly known as saligenol.

It is known to condense phenol, meta-cresol or meta-ethylphenol with formaldehyde in aqueous medium in the presence of zinc acetate or cadmium formate (see British patent specification No. 774,696). Starting with phenol, the best yield of pure saligenol obtained is 21%. With methylsaligenol and ethylsaligenol, the yields obtained are not indicated.

It is also known [H. G. Peer, Rec. Trav. Chim., 79, 825 (1960)] that saligenol is obtained by reacting paraformaldehyde with phenol in benzene in the presence of boric acid. An orthoboric ester is intermediately formed, to which the formaldehyde becomes fixed with the formation of a complex which may be hydrolyzed to give phenol and saligenol. The reaction may be represented as follows:

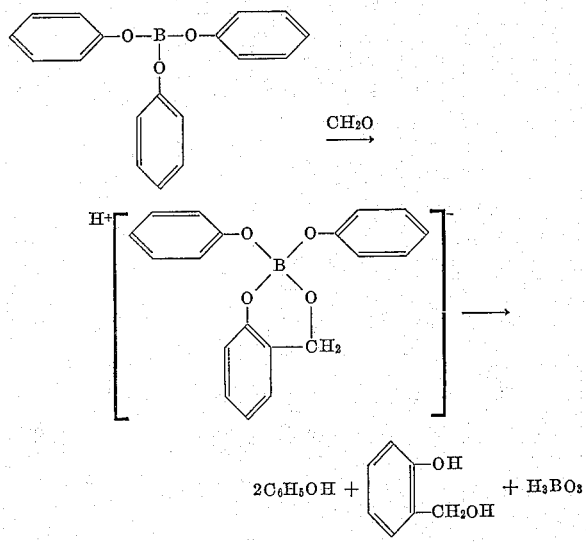

Instead of boric acid, triphenylorthoborate may also be used as catalyst. However, the quantities of saligenol formed are small, and the isolation of pure saligenol from the mixture is difficult. Only 1 g. of pure saligenol was obtained from 20 g. of phenol, 4.66 g. of paraformaldehyde and 10 g. of boric acid, i.e. a yield of about 5%.

The present invention provides a new process by means of which it is possible to obtain in very good yields saligenol and its nuclearly substituted derivatives, more especially those in which the nuclear substituents are halogen atoms or alkyl or alkoxy radicals. The new process comprises reacting a triphenyl metaborate, in which each phenyl group has at least one unsubstituted position ortho to the borate ester link, with formaldehyde, or a substance which generates formaldehyde under the conditions of the reaction, and decomposing the tri(ortho-hydroxybenzyl)metaborate produced to liberate the ortho-hydroxybenzyl alcohol. Ordinarily, the triphenyl metaborate is unsubstituted or substituted on each phenyl group by up to three substituents which are alkyl or alkoxy groups or halogen atoms. The alyl and alkoxy groups which may be attached to the phenyl group may be any alkyl or alkoxy group having from 1 to 12, preferably 1 to 6, carbon atoms, more especially a methyl, ethyl, propyl, butyl, pentyl or hexyl group. The halogen substituents may be chloro, bromo or iodo radicals. Examples of different phenols from which the triphenyl metaborate may be derived are, for example: the cresols, 2,3(or 2,4, 2,5 or 3,4)-xylenol, monoethylphenols, monopropylphenols, monobutylphenols, the monomethyl, monoethyl, monopropyl and monobutyl ethers of pyrocatechol, of resorcinol, and of hydroquinone, the monochlorophenols, 2,3(or 2,4 2,5 or 3,4 or 3,5)-dichlorophenol, 2,4,5-trimethylphenol, 2,3,5-trichlorophenol, 2,3-dimethoxyphenol and 3,5-dimethoxyphenol.

The triaryl metaborates may be prepared by reaction of the corresponding phenol with boric acid or boric anhydride, in a proportion of one molecule of the phenol to one molecule of boric acid or a half molecule of boric anhydride. The reaction may be carried out in the presence of a water entrainment agent such as benzene, toluene, or xylene, the water being distilled out as it is formed.

Generally speaking the triphenyl metaborate is reacted with the formaldehyde or formaldehyde-producing substance at 0° to 150° C. for from 5 minutes to five hours. The pressure will ordinarily be atmospheric pressure as this is most economic but sub- or super-atmospheric pressures can be used.

When the aforesaid triphenyl metaborates are reacted with gaseous formaldehyde, the operation is preferably carried out at room temperature, i.e. at 20–30° C., though it is also possible to operate at higher temperatures. If a formaldehyde polymer such as trioxymethylene is employed, on the other hand, it is always necessary to heat the reaction mixture to a temperature high enough to depolymerise the polymer and liberate formaldehyde, because the formaldehyde only reacts in monomeric form. Since the reaction is oxothermic, it is preferable when using polymeric formaldehyde to add it in small portions.

The reaction should be carried out in anyhydrous medium. The solvent which has been used in the preparation of the metaborate ester is conveniently employed for this purpose. Under these conditions, it is unnecessary to isolate the metaborate after the esterification and the formaldehyde is reacted directly with the ester in the medium in which it has been formed.

The products formed by reacting a triphenyl metaborate with formaldehyde are now substances. The products obtained using the preferred starting materials may be represented by the following generic formula:

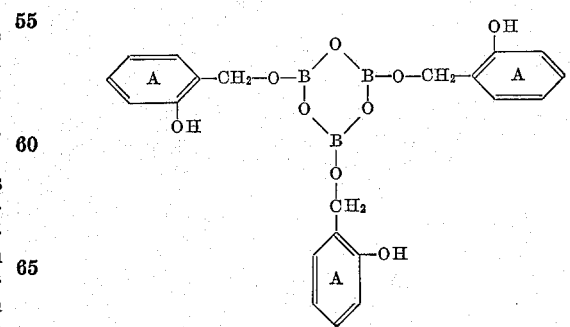

in which each of the rings A may be substituted by up to three substituents which are alkyl or alkoxy groups or halogen atoms.

The product formed by reacting triphenyl metaborate with 3 molecules of formaldehyde is thus the metaborate of saligenol. This is a crystalline substance melting at 95° C., which has a boron content of from 7.2% to 7.4% (theory 7.37%). Its infra-red spectrum indicates the presence of free phenolic hydroxyl groups and has the characteristic absorption bands of the metaborate ring.

The decomposition of the products resulting from reaction of formaldehyde with the triphenyl metaborates is preferably carried out in one of the following ways (1) Saponification with an alkali metal hydroxide to give intermediate complexes which are probably of the type:

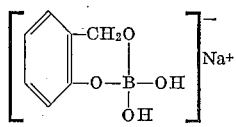

These complexes can be decomposed either by treatment with a mineral acid or by treatment with a substance which chelates boric acid more strongly than ortho-hydroxybenzyl alcohol to be liberated, for example mannitol or sorbitol, which form highly water-soluble complexes with boric acid. The hydroxybenzyl alcohol thus liberated is thereafter extracted with an appropriate solvent, for example diethyl ether.

(2) Transesterification with lower alkanol, such as methanol, which gives a volatile boric acid ester, which is then eliminated by distillation, thus leaving the hydroxybenzyl alcohol.

(3) Hydrolysis of the hydroxybenzyl metaborates with a dilute mineral acid and extracting the hydroxybenzyl alcohol with an appropriate solvent.

The following examples illustrate the invention.

*Example 1*

Into an apparatus provided with a water separator are introduced 47 g. of phenol, 31 g. of boric acid and 25 cc. of toluene, and the mixture is heated and distilled, the entrained water being separated and the toluene returned to the apparatus. When the theoretical quantity of water has been collected (after about 3 hours), the reaction product is diluted with 100 cc. of toluene and a suspension of 15 g. of trioxymethylene in 50 cc. of toluene is added over 10 minutes, the temperature being maintained at 90° C. The insoluble trihydroxymethylene disappears, and the reaction is complete at the end of one hour.

All of the toluene is then distilled off under reduced pressure, and the saligenol metaborate crystallises. This crystalline residue is dissolved in 200 cc. of methanol, and the methanol/methyl orthoborate azeotrope (B.P.$_{400\ mm.}$=41° C.)

is slowly distilled off under 400 mm. Hg. When distillation of methyl orthoborate ceases, 500 cc. of benzene are added and there are successively distilled, under 300 mm. Hg, first the remainder of the methanol, in the form of an azeotrope with benzene (B.P.$_{300\ mm.}$=35° C.), and then the water formed, also in the form of an azeotrope with benzene. The benzene solution remaining is cooled, and the saligenol formed crystallises. Yield: 40 g. of crystalline saligenol, M.P. 84° C. (i.e. 65% of theory).

*Example 2*

Into the same apparatus as in Example 1 are introduced 17.5 g. of boric anhydride, 47 g. of phenol and 25 cc. of toluene. The water formed (4.5 cc.) is eliminated by azeotropic distillation over 8 hours. 100 cc. of toluene and then, over 10 minutes, a suspension of 15 g. of trioxymethylene in 50 cc. of toluene are added, the temperature being maintained at 90° C. After one hour at 90° C., the mixture is cooled. A crystalline mass then forms, which is poured into 200 cc. of iced water. There are then added with stirring 67 g. of sodium hydroxide (as a solution of 36° Bé.). The toluene surface layer is separated and removed. The aqueous layer is washed with 200 cc. of isopropylether, separated and acidified with dilute H$_2$SO$_4$. The saligenol is extracted with ether, the ethereal extract is distilled, and the saligenol residue is recrystallised from benzene. There is thus obtained, in a yield of 62%, a product similar to that of Example 1.

*Example 3*

Saligenol metaborate is prepared and treated with sodium hydroxide as in Example 2. To the alkaline layer obtained are added 95 g. of sorbitol and the saligenol thus liberated is continuously extracted with ether. The ether is thereafter evaporated and the residue recrystallised from benzene. The saligenol, obtained in a yield of 74%, is identical with that of the preceding examples.

*Example 4*

Phenyl metaborate is prepared as in Example 1, whereafter 15 g. of gaseous monomeric formaldehyde are bubbled, with stirring, into the toluene suspension obtained, which is cooled to 25-30° C. The product is thereafter treated as in Example 3, and there is obtained a product comparable with that of the preceding examples (in a yield of 69% based on the phenol used).

*Example 5* p-Cresyl metaborate is prepared by the same method as in Example 2 from 17.5 g. of boric anhydride and 54 g. of p-cresol. It is then condensed with 15 g. of trioxymethylene at 90° C. for one hour. After treatment with alkali, extraction and acidification, there are obtained 46 g. of 2-hydroxy-5-methylbenzyl alcohol, M.P. 104.50° C. Yield: based on the p-cresol used: 79%.

*Example 6*

By proceeding as in Example 5, starting with o-cresol and trioxymethylene, there is obtained 2-hydroxy-3-methylbenzyl alcohol, M.P. 32° C. Yield: 72.5% based on the o-cresol used.

*Example 7*

By proceeding as in Example 5, starting with o-chlorophenol, 2-hydroxy-3-chlorobenzyl alcohol is obtained in a yield of 40%.

*Example 8*

By proceeding as in Example 5, 2-hydroxy-3-ethoxybenzyl alcohol was prepared in a yield of 50% from o-ethoxyphenol.

The hydroxybenzyl alcohols may be oxydized to the corresponding orthohydroxybenzaldehydes which are valuable products for organic synthesis. Moreover hydroxybenzyl alcohols are useful for preparation of resins by means of polycondensation reactions.

We claim:
1. Tri(ortho-hydroxybenzyl)metaborates of the formula:

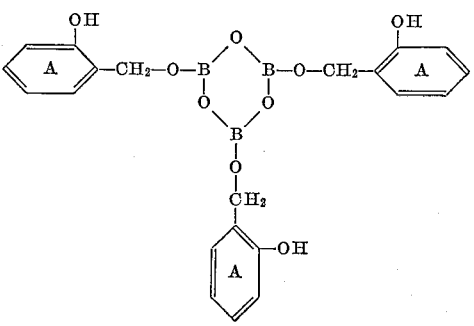

in which each of the rings A may be substituted by up to three substituents selected from the class consisting of alkyl of 1 to 12 carbon atoms alkoxy of 1 to 12 carbon atoms, chlorine, bromine, and iodine.

2. Tri(ortho-hydroxybenzyl)metaborate.
3. Tri(2-hydroxy-5-methylbenzyl)metaborate.
4. Tri-(2-hydroxy-3-methylbenzyl)metaborate.
5. Tri-(2-hydroxy-3-chlorobenzyl)metaborate.
6. Tri-(2-hydroxy-3-ethoxybenzyl)metaborate.

No references cited.

CHARLES B. PARKER, *Primary Examiner.*

D. R. PHILLIPS, *Assistant Examiner.*